H. W. BEINS.
Car Spring.
No. 24,693. Patented July 5, 1859.
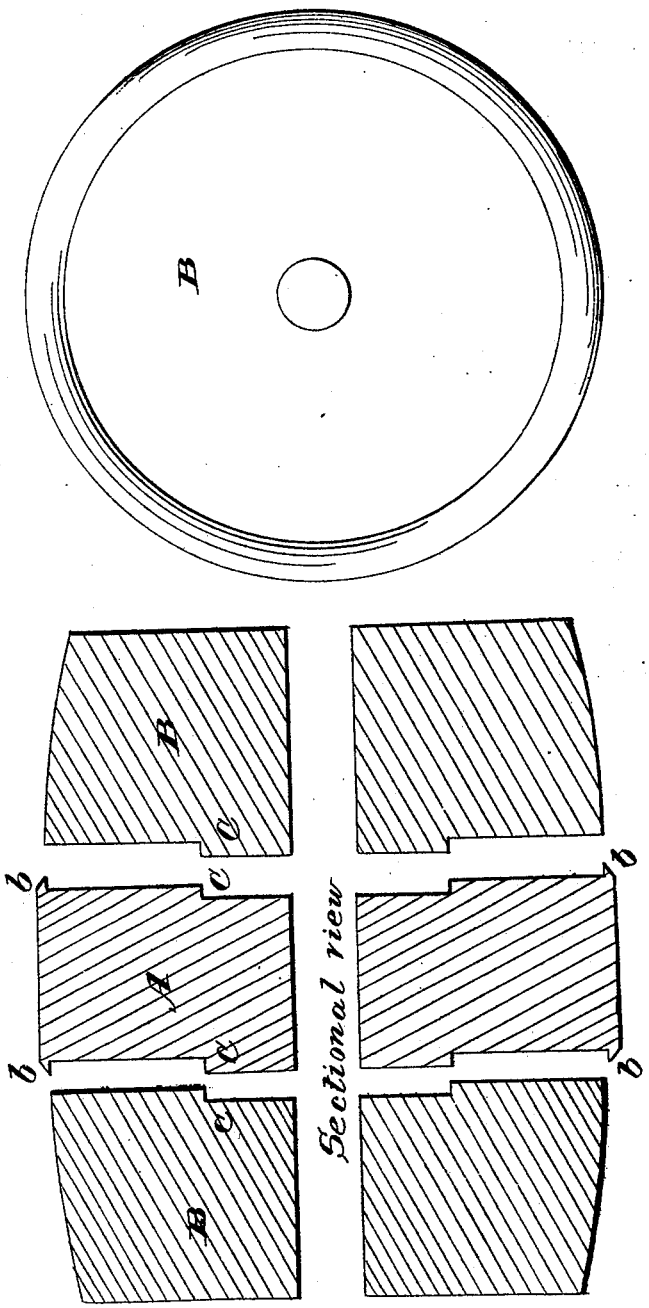

UNITED STATES PATENT OFFICE.

HENRY WM. BEINS, OF NEW YORK, N. Y., ASSIGNOR TO NEW ENGLAND CAR SPRING COMPANY, OF SAME PLACE.

VULCANIZED-RUBBER CAR-SPRING.

Specification of Letters Patent No. 24,693, dated July 5, 1859.

*To all whom it may concern:*

Be it known that I, HENRY WILLIAM BEINS, of the city and State of New York, have invented a new and Improved Form of Car-Spring Made in Two or More Parts of India-Rubber or Similar Vulcanizable Gums.

I will now describe the nature of my invention and improvement, reference being had to the accompanying drawings.

A, the middle part or section of a spring, b, b, two projections, one on each side, serve to receive the two end sections B, B, in their perpendicular direction and to keep them together until they are put in their place in the car. The same object may be effected by different constructions as may be seen by reference to the accompanying drawing, the middle section having a circular projection (C,) around the hole on one side and a cavity (C) on the other, and on one of the end pieces a projection and the other a cavity so as to match each other.

The manner in which I operate is as follows: Molds are constructed for the several sections of the springs as above described, and filled with the unvulcanized spring compound, which is then subjected to a high degree of heat until thoroughly vulcanized. The spring being composed of two or more pieces, and each piece being vulcanized in a separate mold, nearly the entire vulcanizing is performed through their flat surface, whereby the circumference or outside of the spring as it appears when the parts are put together, is exempted from the injurious effects caused by the necessarily longer time cylinder springs have to be exposed to a high degree of heat, in order to vulcanize them to their centers.

What I claim as my invention, and wish to secure by Letters Patent, is—

The sectional gum car spring, of two or more pieces, vulcanized in the manner herein set forth.

H. W. BEINS.

Witnesses:
I. H. THOMPSON,
J. HUTTON.